United States Patent [19]
Sham et al.

[11] Patent Number: 6,006,653
[45] Date of Patent: Dec. 28, 1999

[54] COFFEE MAKER

[75] Inventors: John C. K. Sham, Hong Kong, The Hong Kong Special Administrative Region of the People's Republic of China; Kumkit KunavongVorakul, Bangkok, Thailand

[73] Assignee: Wing Shing Products (BVI) Co., Ltd., Aberdeen, The Hong Kong Special Administrative Region of the People's Republic of China

[21] Appl. No.: 09/134,761

[22] Filed: Sep. 14, 1998

[51] Int. Cl.$^6$ .................................................... A47J 31/10
[52] U.S. Cl. ................................................ 99/281; 99/280
[58] Field of Search ........................... 99/281, 282, 280; 219/492, 497; 392/478, 485

[56] References Cited

U.S. PATENT DOCUMENTS

| | | | |
|---|---|---|---|
| 4,531,046 | 7/1985 | Stover | 99/281 X |
| 5,183,998 | 2/1993 | Hoffman et al. | 99/281 X |
| 5,549,035 | 8/1996 | Wing-Chung | 99/281 |
| 5,684,759 | 11/1997 | Huang et al. | 99/281 X |

*Primary Examiner*—Reginald L. Alexander
*Attorney, Agent, or Firm*—Salzman & Levy

[57] ABSTRACT

An electronic coffee maker having a control circuit that allows for selective warming of brewed coffee. The control circuit has a micro-control unit that controls the heating coils of the coffee maker. Selector buttons allow the user to choose the delay time and the power levels for keeping the brewed coffee warm. This selectivity prevents the brewed coffee from becoming overly cooked.

3 Claims, 2 Drawing Sheets

COFFEE MAKER

FIELD OF THE INVENTION

The present invention relates to household appliances and, more particularly, to a coffee maker having a novel micro-control unit that allows for selective brewing and warming of the coffee.

BACKGROUND OF THE INVENTION

The electronic coffee maker has become a ubiquitous household item. There are many different commercial coffee makers. Some brew coffee from grinds. Other coffee makers grind the coffee beans and then brew the coffee. Some coffee makers allow the user to set the time when brewing is to begin. The coffee maker is set prior to going to sleep. This has the advantage of providing freshly brewed coffee when the user wakes in the morning. The user wakes to the scent of freshly brewed coffee and is able to enjoy a fresh cup without the usual morning fuss.

All of the aforementioned coffee makers suffer from one annoying deficiency: the coffee is kept warm indefinitely after the brewing has terminated. After several hours, the coffee develops a "cooked" smell and taste, and the operator usually discards any coffee that has not been used. Not only is this wasteful, but the smell of the cooked coffee creates a negative impression upon the taste buds and olfactory senses of the coffee aficionado.

The present invention provides a coffee maker, the circuitry and control unit of which allow for selective brewing and warming of the coffee. Coffee is prepared and kept warm for a selected time, so that the coffee never becomes overly cooked or overly strong. In addition, the warming cycle has three different power levels, so that the coffee loses water by heated evaporation at three different selective rates. In this regard, the "cooking effect" can be substantially diminished or eliminated.

SUMMARY OF THE INVENTION

In accordance with the present invention, there is provided a coffee maker having a micro-control unit that can selectively brew and keep coffee warm. The micro-control unit is operatively connected between a digital display and selector buttons for choosing the time for brewing and/or keeping the brewed coffee warm. The circuitry also features a selection for automatic and manual cycles. The micro-control unit is connected to the coffee heating coils through a relay control circuit including a PNP transistor and a relay unit.

A timing element and triac control element are also provided for controlling the coffee brewing and warming times via the selector buttons. The timing element provides a countdown, so that the coffee can be brewed in the manner commonly known in the art. The user can choose between three different power levels via the triac control element. A selector button is available for choosing a "keep warm setting mode." A "clock setting mode" button allows the user to set the clock time in an hour and minute format for the digital display, as common in the art. The relay control circuit actuates the heating coils, when the micro-control unit provides a Logic Low signal to turn on the PNP transistor connected to the relay and/or the triac control circuit.

It is an object of this invention to provide an improved electronic coffee maker.

It is another object of the invention to provide an electronic coffee maker having means for selectively warming brewed coffee.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an electronic coffee maker having a control circuit that allows for selective warming of brewed coffee. The control circuit has a micro-control unit that controls the heating coils of the coffee maker. Selector buttons allow the user to choose the delay time and the power levels for keeping the brewed coffee warm. This selectivity prevents the brewed coffee from becoming overly cooked.

Figure 1:
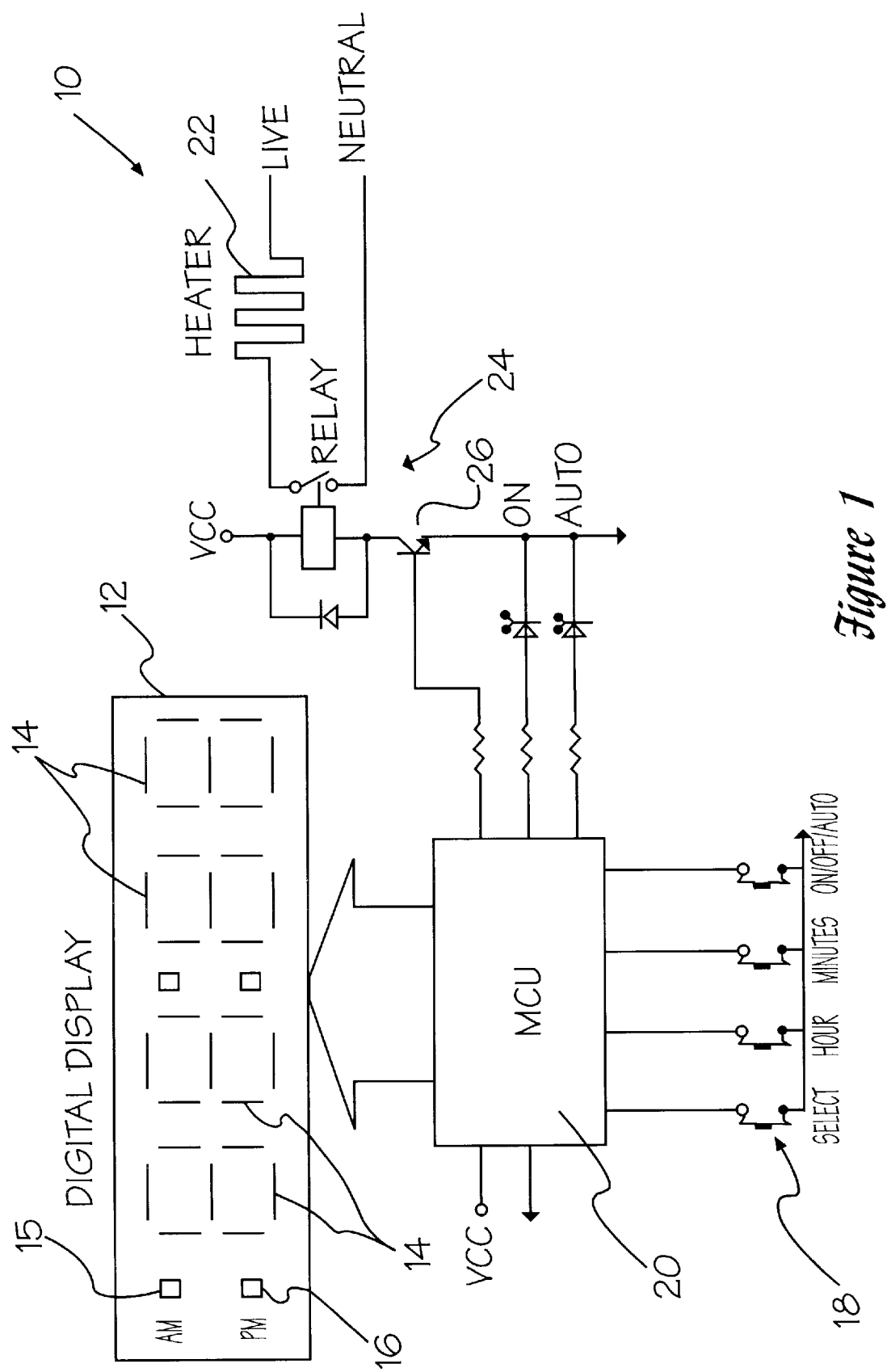
FIG. 1 illustrates a schematic electrical diagram of the timing circuit for the coffee maker of the invention.

Now referring to FIG. 1 a circuit 10 is shown for controlling a coffee maker, not shown, in accordance with the invention. The circuit 10 comprises a digital display 12 having digital elements 14 for displaying the time of day, including LEDs 15 and 16 for AM and PM settings, respectively. A number of selector buttons 18 actuate a micro-control unit (MCU) 20 that is electrically connected to the digital display 12 for setting the current time in hours and minutes, as is common in the art. The selector buttons 18 also set the time in hours and minutes for turning on the coffee maker, in order to brew coffee. The selector buttons 18 also provide means for choosing a delay time and power level for keeping the coffee warm.

The MCU 20 is connected to the heating coils 22 of the coffee maker through a relay control and triac circuit 24. The relay control and triac circuit 24 actuates the heating coils 22 when the MCU 20 provides a "Logic Low" signal to turn on the PNP transistor 26 connected to the relay control and triac circuit 24, via the selector buttons 18. The selector buttons 18 allow the user to choose between manual brewing and automatic brewing modes of operation. The selector buttons 18 also provide the user with the option of automatically turning off the heating coils 22, which option is dependent upon the keep warm time.

Figure 2:
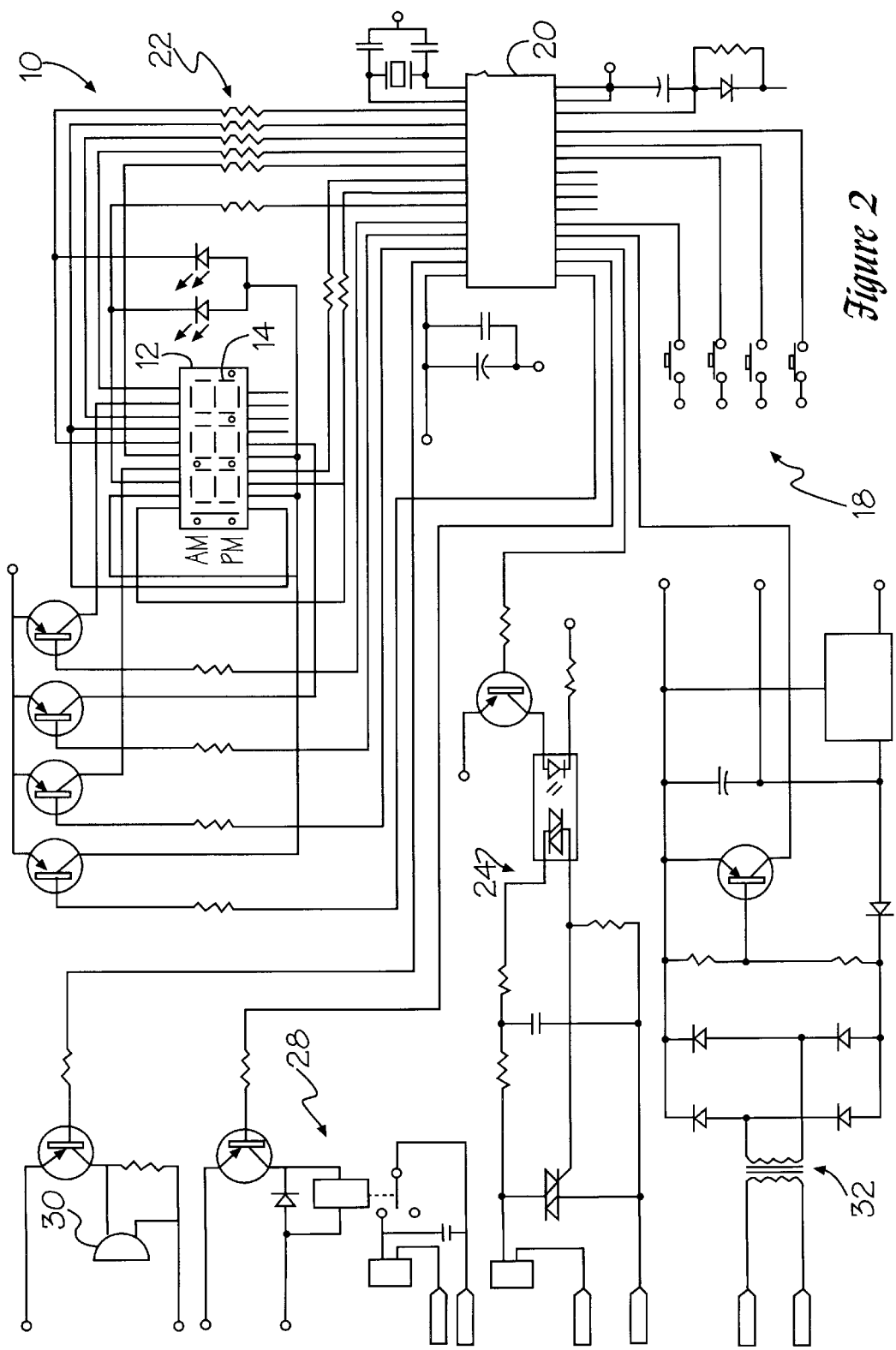
FIG. 2 depicts a more detailed circuit for the coffee maker circuit shown in FIG. 1.

Now referring to FIG. 2, a more detailed diagram of the circuit 10 is illustrated. The selector buttons 18 are shown connected to the MCU 20 along lines 5, 10, 11, and 12. The MCU 20 is connected to the digital display 12 along lines A, B, C, D, E, F and DP3-4. Transistor $Q_7$ actuates the triac circuit 24 that controls the power level for the heating coils 22. Transistor $Q_6$ actuates the relay circuit 28. Transistor $Q_8$ actuates the buzzer 30, which automatically signals when brewing is completed. Transistor $Q_1$ provides a "zero crossing" signal to the MCU 20 in order to suppress noise generated by a power input transformer 32. Transistors $Q_2$, $Q_3$, $Q_4$, and $Q_5$, connected between the MCU 20 and the digital display 12, actuate the digital elements 14 of the display 12, in a conventional manner well known in the art.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electronic circuit for a coffee maker, comprising:

a power source including a power input transformer;

a heating unit for brewing and keeping coffee warm;

a digital display for indicating time;

a micro-control unit connected to said digital display, said heating unit, and said power source for controlling brewing and warming sequences of said coffee maker;

noise suppression means operatively connected to said power input transformer and to said micro-control unit, for generating a "zero crossing" signal for said micro-control unit to prevent noise generated by said power input transformer from affecting said electronic circuit;

a plurality of selector buttons connected to said micro-control unit for choosing various coffee maker modes of operation; and a triac control unit connected to said micro-control unit to provide different power levels for keeping brewed coffee warm.

2. An electronic circuit for a coffee maker, comprising:

a power source;

a heating unit for brewing and keeping coffee warm;

a digital display for indicating time;

a micro-control unit connected to said digital display, said heating unit, and said power source for controlling brewing and warming sequences of said coffee maker;

a plurality of selector buttons connected to said micro-control unit for choosing various coffee maker modes of operation; and a relay circuit connected to said micro-control unit to delay the warming of brewed coffee in order to prevent overheating thereof.

3. An electronic circuit for a coffee maker, comprising:

a power source;

a heating unit for brewing and keeping coffee warm;

a digital display for indicating time;

a micro-control unit connected to said heating unit for controlling brewing and warming sequences of said coffee maker;

a plurality of selector buttons connected to said micro-control unit for choosing various coffee maker modes of operation;

a triac control unit connected to said micro-control unit to provide different power levels for keeping brewed coffee warm; and a relay circuit connected to said micro-control unit to delay the warming of brewed coffee in order to prevent overheating thereof.

* * * * *